(12) United States Patent
Cund et al.

(10) Patent No.: US 8,781,706 B2
(45) Date of Patent: Jul. 15, 2014

(54) MONITORING APPARATUS AND METHOD

(75) Inventors: Mark Cund, Redditch (GB); Paul Widdowson, Retford (GB); Alain Dunoyer, Coventry (GB); Adrie Breugelmans, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 86 days.

(21) Appl. No.: 13/434,704

(22) Filed: Mar. 29, 2012

(65) Prior Publication Data

US 2012/0253549 A1    Oct. 4, 2012

(30) Foreign Application Priority Data

Mar. 29, 2011  (GB) .................................. 1105186.9

(51) Int. Cl.
*B60T 7/12* (2006.01)
(52) U.S. Cl.
USPC ................ 701/96; 702/104; 342/69; 701/301
(58) Field of Classification Search
USPC ........ 701/1, 93, 96, 301; 342/69, 70; 702/104
See application file for complete search history.

(56) References Cited

U.S. PATENT DOCUMENTS

| | | | | |
|---|---|---|---|---|
| 6,246,949 B1 * | 6/2001 | Shirai et al. | ...................... | 701/96 |
| 7,720,580 B2 * | 5/2010 | Higgins-Luthman | ........... | 701/28 |
| 7,991,550 B2 * | 8/2011 | Zeng | .............................. | 701/301 |
| 8,269,652 B2 * | 9/2012 | Seder et al. | .................... | 340/903 |
| 8,384,531 B2 * | 2/2013 | Szczerba et al. | ............. | 340/435 |
| 2002/0138223 A1 * | 9/2002 | Schneider et al. | ............ | 702/104 |
| 2003/0208312 A1 | 11/2003 | Winter et al. | | |
| 2004/0148063 A1 * | 7/2004 | Patchell | ............................ | 701/1 |
| 2005/0116854 A1 * | 6/2005 | Beez et al. | ....................... | 342/70 |
| 2007/0182623 A1 | 8/2007 | Zeng et al. | | |
| 2008/0300787 A1 * | 12/2008 | Zeng | .............................. | 701/301 |
| 2009/0292468 A1 * | 11/2009 | Wu et al. | ....................... | 701/301 |
| 2012/0290169 A1 * | 11/2012 | Zeng et al. | ................... | 701/30.2 |

FOREIGN PATENT DOCUMENTS

GB    2334842    2/1998

OTHER PUBLICATIONS

UK Search Report for GB1105186.9, dated Jul. 28, 2011, 2 pages.

* cited by examiner

*Primary Examiner* — Helal A Algahaim
*Assistant Examiner* — Shardul Patel
(74) *Attorney, Agent, or Firm* — Carlson, Gaskey & Olds

(57) ABSTRACT

An apparatus for monitoring one or more target objects in an environment external to a host vehicle by means of at least one sensor, the apparatus being arranged to trigger at least one action responsive to the detection of prescribed relative movement between the host vehicle and the one or more target objects. The apparatus is arranged to determine whether the at least one sensor is correctly aligned with respect to the host vehicle whereby, when the apparatus commences monitoring of the environment, the apparatus is arranged not to trigger the at least one action until the apparatus has determined that the at least one sensor is correctly aligned.

16 Claims, 2 Drawing Sheets

MONITORING APPARATUS AND METHOD

FIELD OF THE INVENTION

The present invention relates to an apparatus and a method for monitoring a target object external to a vehicle. Aspects of the invention relate to an apparatus, to a method and to a vehicle.

BACKGROUND

It is known to provide a vehicle having apparatus arranged to identify target objects in front of or behind the vehicle and to activate automatically a braking system of the vehicle if the vehicle determines that collision with the object is imminent.

Such systems typically employ radar or ultrasonic transmitter/receiver modules. The well known Doppler effect is used to determine a range and rate of change of range (or 'range rate') of the object from the vehicle.

It is desirable to provide improved apparatus to increase the likelihood that the apparatus will correctly identify a target object that represents a collision risk to the vehicle. It is an aim of the present invention to address this issue. Other aims and advantages of the invention will become apparent from the following description, claims and drawings.

SUMMARY OF THE INVENTION

In one aspect of the invention for which protection is sought there is provided monitoring apparatus for monitoring one or more target objects in an environment external to a host vehicle by means of at least one sensor, the apparatus being arranged to trigger at least one action responsive to the speed of the host vehicle and detection of predetermined relative movement between the host vehicle and the one or more target objects thereby to reduce a risk of collision of the host vehicle with the one or more target objects, the apparatus being further arranged to determine whether the at least one sensor is correctly aligned with respect to the host vehicle, wherein when the monitoring apparatus commences monitoring of the environment the apparatus is arranged not to trigger the at least one action until it is determined that the at least one sensor is correctly aligned.

In an aspect of the invention for which protection is sought there is provided apparatus for monitoring one or more target objects in an environment external to a host vehicle by means of at least one sensor, the apparatus being arranged to trigger at least one action responsive to the detection of prescribed relative movement between the host vehicle and the one or more target objects, wherein the apparatus is arranged to determine whether the at least one sensor is correctly aligned with respect to the host vehicle whereby when the apparatus commences monitoring of the environment the apparatus is arranged not to trigger the at least one action until the apparatus has determined that the at least one sensor is correctly aligned.

Embodiments of the invention have the advantage that a risk that the host vehicle triggers an action responsive to detection of relative movement between the host vehicle and a target object due to false information concerning the relative movement may be reduced.

It is to be understood that false information may be provided for example due to an abrupt change in alignment of the at least one sensor following a collision between the host vehicle and an object whilst the vehicle is parked. When the monitoring apparatus commences monitoring of the environment as the vehicle subsequently drives away, the risk exists that the apparatus will fail to recognise that a change in alignment has occurred before triggering automatically an action such as application of the brakes of the vehicle. Thus the apparatus may determine that a target object presents a collision risk when in fact it does not, triggering application of the brakes unnecessarily.

Embodiments of the present invention effectively suppress the triggering of a response by the apparatus until correct alignment of the sensor has been specifically verified. Thus, a risk that the apparatus triggers application of the brakes based on false target information is reduced.

It is to be understood that known monitoring apparatus is able to determine an angle of misalignment between a sensor and an axis of the vehicle based on the identification of stationary objects and the tracking of relative movement between the host vehicle and the stationary objects.

However it can take a not insignificant period of time (of the order of minutes or tens of minutes) for determination of sensor alignment to take place. Whilst such verification is taking place, the apparatus may be arranged to monitor moving (i.e. non-stationary) target objects and to determine whether relative movement between the moving target objects and the vehicle is such that a collision with the moving target object is imminent.

If the vehicle determines that such a collision is imminent the vehicle may trigger a response such as pre-arming of brakes of the vehicle or application of the brakes to slow the vehicle before it has determined whether or not the sensor is correctly aligned.

As noted above, embodiments of the present invention have the feature that the apparatus is not permitted to allow triggering of the braking system automatically unless correct alignment of the at least one sensor has been verified since the apparatus last started monitoring the environment external to the vehicle. The risk that braking action is triggered automatically responsive to a target object that does not present a collision threat to the vehicle is therefore reduced.

Advantageously the apparatus may be arranged to trigger the at least one action responsive to the detection of prescribed relative movement between the host vehicle and the one or more target objects in dependence on the speed of the host vehicle.

Advantageously the apparatus may be operable to determine whether the at least one sensor is correctly aligned responsive to measurement of relative movement between the vehicle and at least one stationary target object.

Further advantageously the apparatus may be operable repeatedly to determine whether the at least one sensor is correctly aligned responsive to measurement of the relative movement between the vehicle and at least one target object.

The apparatus may be arranged to allow triggering of the at least one action when the apparatus has determined that the at least one sensor is correctly aligned at a prescribed number of successive moments in time.

Alternatively or in addition the apparatus may be arranged to allow triggering of the at least one action when the apparatus has determined that the at least one sensor is correctly aligned when each of a prescribed number of successive measurements of alignment have been performed.

Each successive measurement of alignment may be made with respect to a target object that is different from the target object with respect to which the preceding measurement of alignment was made.

This feature has the advantage that alignment may be checked with respect to a number of different target objects thereby reducing a risk that a misleading alignment measurement is made due to a particular target object.

Advantageously the apparatus may be arranged to store a value of a reference angle parameter indicative of a reference angle of misalignment of the at least one sensor, the apparatus being arranged to determine whether the at least one sensor is correctly aligned by comparing a measured value of misalignment angle with the reference angle.

Further advantageously the apparatus may be configured to set a confidence parameter being a parameter indicative of a level of confidence that the at least one sensor is correctly aligned to a first value when the apparatus commences monitoring of the environment, the first value indicating that confidence is low, and subsequently to increment the value of the first parameter by a prescribed increment value each time it is determined that a difference between the measured angle of misalignment and the reference angle of misalignment is less than or equal to a prescribed tolerance angle.

It is to be understood that the prescribed increment value may be a positive value or a negative value. The first value may be zero or any positive or negative value. Other values are also useful.

The apparatus may be configured to decrement the confidence parameter by a prescribed decrement value each time it is determined that a difference between the measured angle of misalignment and the reference angle is greater than the prescribed tolerance angle.

The decrement value may be greater than the increment value.

This has the advantage that the value of the confidence parameter is more sensitive to measurements of alignment that are outside of the prescribed tolerance angle than those that are within the prescribed tolerance angle.

Alternatively the decrement and increment values may be the same.

The apparatus may be configured to set the confidence parameter to the first value if the reference angle exceeds a prescribed maximum reference angle value.

Thus, if the measured misalignment angle is greater than a prescribed value the apparatus is arranged to reset the confidence value to the first value.

The reference angle parameter may be an average value of the measured value of misalignment angle over a prescribed number of measurements of misalignment angle.

The apparatus may be arranged to allow triggering of the at least one action only if the value of the confidence parameter exceeds a prescribed second value.

Advantageously the apparatus may comprise or may be provided in combination with range determination means operable to determine the range of the target object from the host vehicle and the rate of change of the range.

Advantageously the range determination means may comprises a radar transmitter and a radar receiver, the apparatus being arranged to determine the range of the target object from the vehicle by means of a radar signal transmitted from the transmitter and received at the receiver following reflection by the target object.

Alternatively or in addition the range determination means may comprise an ultrasonic transmitter and an ultrasonic receiver, the apparatus being arranged to determine the range of the target object from the host vehicle by means of an ultrasonic signal transmitted from the transmitter and received at the receiver following reflection by the target object.

In a further aspect of the invention for which protection is sought there is provided a host vehicle comprising apparatus according to the preceding aspect.

In one aspect of the invention there is provided a method of monitoring one or more target objects in an environment external to a host vehicle by means of at least one sensor, the method comprising detecting a position of the one or more target objects with respect to the vehicle and triggering at least one action responsive to the detection of prescribed relative movement between the host vehicle and the one or more target objects, the method further comprising determining whether the at least one sensor is correctly aligned with respect to the vehicle, whereby when the monitoring apparatus commences monitoring of the environment the method comprises not triggering the at least one action until the apparatus has determined that the at least one sensor is correctly aligned.

In a still further aspect of the invention for which protection is sought there is provided a method of monitoring one or more target objects in an environment external to a host vehicle by means of at least one sensor, the method comprising detecting a position of the one or more target objects with respect to the vehicle and triggering at least one action responsive to a speed of the host vehicle and detection of predetermined relative movement between the host vehicle and the one or more target objects thereby to reduce a risk of collision of the host vehicle with the one or more target objects, the method further comprising determining whether the at least one sensor is correctly aligned with respect to the vehicle, whereby when the monitoring apparatus commences monitoring of the environment the method comprises not triggering the at least one action until the apparatus has determined that the at least one sensor is correctly aligned.

In another aspect of the invention for which protection is sought there is provided a monitoring apparatus for monitoring one or more target objects in an environment external to a vehicle by means of at least one sensor, each sensor having a sensor axis, the apparatus being arranged to determine an angle of misalignment between the sensor axis and a first axis of the vehicle and to provide an output responsive to a determination whether the difference is within a required range, wherein after the monitoring apparatus commences monitoring of the environment the apparatus is arranged to report that the difference is not within the required range regardless of whether or not the difference is actually within the required range.

The apparatus may be arranged subsequently to provide an output responsive to a determination by the apparatus whether the difference is actually within the prescribed range.

In yet another aspect of the invention for which protection is sought there is provided a monitoring apparatus for monitoring one or more target objects in an environment external to a vehicle by means of at least one sensor, each sensor having a sensor axis, the apparatus being arranged to determine an angle of misalignment between the sensor axis and a first axis of the vehicle and to provide an output responsive to a determination whether the difference is within a prescribed range, wherein when the monitoring apparatus commences monitoring of the environment the apparatus is arranged to provide an output indicating the difference is not within the prescribed range until the apparatus has determined that the angle of misalignment is within the prescribed range.

The apparatus may be arranged to provide an output indicating the difference is within the prescribed range after performing a prescribed number of successive measurements of alignment of the at least one sensor each of which indicates the at least one sensor is correctly aligned.

Within the scope of this application it is envisaged that the various aspects, embodiments, examples, features and alternatives set out in the preceding paragraphs, in the claims and/or in the following description and drawings may be taken independently or in any combination thereof.

BRIEF DESCRIPTION OF THE DRAWINGS

Embodiments of the invention will now be described, by way of example only, with reference to the accompanying figures in which.

DETAILED DESCRIPTION OF THE ILLUSTRATED EMBODIMENTS

Figure 1:
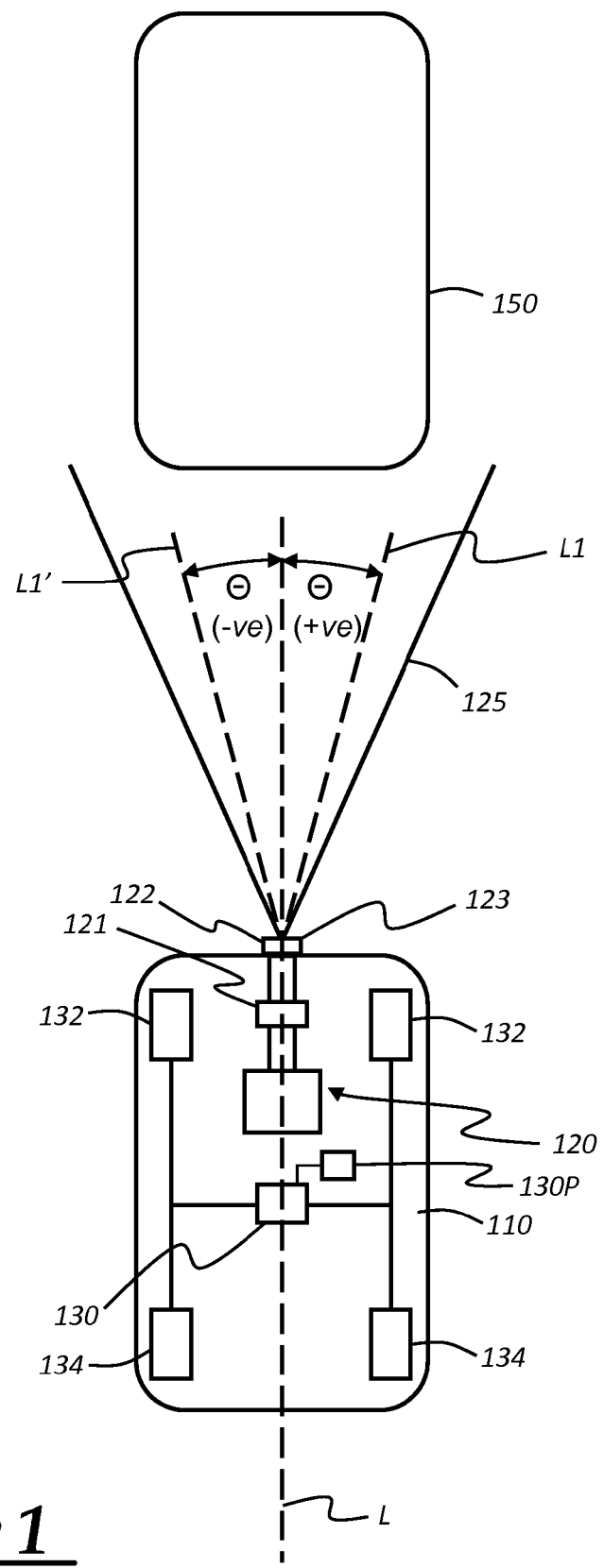
FIG. 1 is a schematic illustration of an apparatus embodying one form of the present invention installed in a motor vehicle.

In one embodiment of the invention a monitoring apparatus 120 is provided in a motor vehicle 110 as shown in FIG. 1. The monitoring apparatus 120 has a radar module 121 arranged to identify the presence of a target object ahead of the vehicle 110 such as a lorry 150. The radar module 121 is arranged to determine the range R of the object from the vehicle 110 and the rate of change of the range of the object R' from the vehicle 110 ('range rate').

The monitoring apparatus 120 is part of an intelligent emergency braking system (IEB) of the vehicle 100. The IEB system is operable to control a braking system of the vehicle 110 to slow or stop the vehicle in the event that certain prescribed conditions are met. The apparatus 120 is therefore coupled to a brake controller 130 of the vehicle. The brake controller 130 is in turn arranged to control a braking system of the vehicle responsive to an input from the apparatus 120 or a driver-operated brake pedal 130P.

The braking system includes a pair of front brakes 132 and a pair of rear brakes 134. The front brakes 132 are arranged to apply a braking action to a pair of front wheels of the vehicle 110 whilst the rear brakes 134 are arranged to apply a braking action to a corresponding pair of rear wheels of the vehicle 110.

The brakes 132, 134 are brakes of the type having a brake pad and a brake disc. Braking action is obtained by urging the brake pad against the brake disc.

The brake controller 130 is operable to control the front brakes 132 and rear brakes 134 to execute a braking action by increasing a pressure of brake fluid in brake fluid lines of the vehicle 110.

It is to be understood that when a pressure of brake fluid in the braking system is increased initially, the brake pad of each brake 132, 134 moves into contact with the corresponding disc of the brake 132, 134.

With further increasing brake fluid pressure the pads are urged against the discs causing the brakes 132, 134 to provide the required braking action.

The monitoring apparatus 120 is operable to provide an alert signal to the brake controller 130 to cause braking of the vehicle in the event the apparatus 120 determines that a risk of collision of the vehicle with a target object is sufficiently high.

Other arrangements are also useful.

The radar module 121 of the apparatus 120 has a radar transmitter 122 and a radar receiver 123. In the embodiment of FIG. 1 the radar module 121 is a Delphi ESR (electronically scanning radar) module (Delphi, Troy, Mich.).

The radar module 121 is arranged to control the radar transmitter 122 to transmit a radar signal 125 ahead of the vehicle 110. The radar receiver 123 is arranged to detect portions of the radar signal 125 that are reflected back towards the vehicle 110 by objects ahead of the vehicle. The module 121 is configured to determine the range R of the objects ahead of the vehicle by measuring a phase difference between the radar signal 125 transmitted by the transmitter 122 and the signal received by the receiver 123. It is to be understood that in some embodiments a time of flight analysis of the reflected radar signal may be employed to determine the range of objects ahead of the vehicle.

The module 121 is further configured to determine the range rate R' of the objects based on a frequency of the radar signal detected by the receiver 123 relative to that of the radar signal transmitted by the transmitter 122. It is to be understood that the frequency will be different depending on the relative speeds of the vehicle 110 and objects detected by the module 121, a phenomenon known as the 'Doppler effect'.

In the embodiment of FIG. 1 the transmitter 122 and receiver 123 are provided in the form of a transmit/receive unit (TRU) 124.

The module 121 is arranged to monitor the position of one or more stationary objects within a field of view of the apparatus 120 and to determine the value of an angle of misalignment between an axis of the TRU 124 and an axis of the vehicle 100 as the vehicle 110 moves relative to the one or more stationary objects.

A determination as to whether an object is a stationary object or a moving object is made based on the relative movement of the object with respect to the vehicle 110, the speed of the vehicle 110 and the steering angle of the vehicle 110.

The module 121 is arranged to generate a misalignment parameter auto_alignment_angle_fast corresponding to the angle of misalignment θ between a longitudinal axis L1 of the TRU 124 and a longitudinal axis L of the vehicle 110 as measured by the apparatus. The value of auto_alignment_angle_fast corresponds to the most recently measured value of θ by the apparatus.

It is to be understood that in respect of a TRU 124 having a longitudinal axis L1 oriented with respect to the longitudinal axis L of the vehicle 11 as shown in FIG. 1 the misalignment angle may be considered to be a positive angle θ. In the case of a TRU 124 have a longitudinal axis L1' oriented as shown the misalignment angle may be considered to be a negative angle θ. Other conventions are also useful; thus a TRU 124 having a longitudinal axis L1 oriented as shown in FIG. 1 may be considered to have a negative misalignment angle instead of a positive angle, and L1' may considered to have a positive misalignment angle instead of a negative angle.

The module 121 is arranged to determine a running average value, auto_alignment_angle, of the parameter auto_alignment_angle_fast over a prescribed number of samples of misalignment angle θ.

In one embodiment the value of auto_alignment_angle corresponds to the average value of auto_alignment_angle_fast over the previous 2000 samples of misalignment angle. The value of auto_alignment_angle may typically be determined by a module 121 to be a value in the range from around −2° to around +2° in some vehicles 110 although other values may also be observed.

The module 121 also stores a value of a parameter 'confidence'. When the module 121 first commences monitoring of the environment when the vehicle is first started, the value of the confidence parameter is set to zero, i.e. confidence=0.

The module 121 then performs the measurement of the angle of misalignment between the longitudinal axis of the TRU 124 and the longitudinal axis L of the vehicle, auto_alignment_angle_fast and calculates the difference between auto_alignment_angle_fast and auto_alignment_angle. If the difference is less than a prescribed threshold value the module 121 increments the value of confidence by 0.25. If the difference is greater than the prescribed threshold value the module decrements the value of confidence by 20. If the value of confidence is less than 20 the module 121 sets the value of confidence to zero.

In some embodiments the prescribed threshold value is around 0.1°. Other values of the prescribed threshold are also useful.

It is to be understood that the value of auto_alignment_angle_fast may be found to differ from the value of auto_alignment_angle due for example to a collision between the vehicle 100 and an object, for example during a period for which the vehicle 110 is parked and left unattended by the driver.

It is to be understood that if such a collision has occurred, when the vehicle 110 subsequently drives away the increased misalignment of the TRU 124 due to the collision may cause the module 121 to make an incorrect determination concerning a direction and/or speed of relative movement between the vehicle 110 and one or more objects external to the vehicle.

It is to be understood that the value of confidence increases each time a fresh determination of auto_alignment_angle_fast is made and the difference between it and auto_alignment_angle found to be less than 0.1°. It is to be understood that in the present embodiment a fresh determination of auto_alignment_angle_fast is made only when a new stationary target has been identified.

When the value of the confidence parameter reaches a prescribed threshold value, the module 121 allows the IEB system to trigger braking of the vehicle 110 if it is determined that a risk of collision is sufficiently high.

It is to be understood that until the value of confidence reaches the prescribed threshold value (which may be a value of (say) 80, 90, 100 or any other suitable value), triggering of the IEB system is not permitted by the module 121 as discussed above.

In the present embodiment the value of confidence may be any value between 0 and 100 in increments of 0.25. Once the value of confidence exceeds 80 (i.e. when confidence has a value of 80.25 or higher) automatic emergency braking is permitted. Once the value of confidence reaches 100 it is not permitted to be increased further. Likewise if the value falls to zero it is not permitted to fall to a lower value.

Thus, if when the module 121 begins monitoring the environment external to the vehicle 110 the value of auto_alignment_angle_fast is determined to be (say)+1.05° and the value of auto_alignment_angle stored by the module 121 is +1°, the module 121 determines that the difference between these two parameters is 0.05°. Because this difference is less than or equal to the threshold value of 0.1° the value of confidence is incremented. The value of confidence is initially set to zero as described above when the module 121 first commences monitoring of the environment when the vehicle is first started.

As noted above, in the present embodiment the value of confidence is incremented by 0.25. Other values of increment are also useful, such as 0.5, unity or any other suitable value.

It is to be understood that relatively small increments are advantageous. This is at least in part because this ensures that a relatively large number of readings for which the difference between auto_alignment_angle_fast and auto_alignment_angle is less than the threshold value will be required to be obtained before the value of confidence rises from the initial (reset) value of zero to a value at which automatic (or autonomous) emergency braking by the vehicle will be permitted.

If however the value of auto_alignment_angle_fast is determined to be (say)+1.15° and the value of auto_alignment_angle stored by the module 121 is +1°, the module 121 determines that the difference between these two parameters is 0.15°. Because this difference is greater than the threshold value of 0.1° the value of confidence is decremented.

As noted above in the present embodiment the value of confidence is decremented by a value of 20. Other values are also useful.

The amount by which the value of the parameter confidence is decremented is higher than that by which the value is incremented as described above. Furthermore, since the value of confidence must be greater than 80 before automatic emergency braking is permitted, it will be understood that a single measurement in which the difference between auto_alignment_angle_fast and auto_alignment_angle exceeds the threshold value of 0.1° will result in the value of confidence falling to a value at which automatic emergency braking is not permitted. Automatic emergency braking would not be permitted until the value of confidence again exceeded 80.

Thus if the value of confidence was 100 and a single reading falling outside the threshold value of 0.1° was made, the value of confidence would fall to 80.

If the next value of auto_alignment_angle_fast was within 0.1° of auto_alignment_angle the value of confidence would increment by 0.25. The value of confidence would then be greater than 80 (i.e. 80.25) and automatic emergency braking would be permitted.

Employment of relatively large values by which confidence is decremented have the advantage that a risk that automatic emergency braking takes place responsive to data acquired when the TRU 124 is misaligned is reduced.

If however the TRU 124 is in fact correctly aligned and a single spurious reading indicating misalignment is received, the next reading being a reading indicating correct alignment, automatic emergency braking would only be prohibited in the period between the reading of auto_alignment_angle_fast indicating alignment was outside the 0.1° tolerance and the reading of auto_alignment_angle_fast indicating alignment was within the 0.1° tolerance. That is, for the period for which the value of confidence was not greater than 80.

If the value of auto_alignment_angle or the value of auto_alignment_angle_fast is found to exceed a prescribed maximum alignment angle value, the module 121 is arranged to set the value of confidence to zero. In some arrangements the prescribed maximum alignment angle value may be set to a value above which measurement of the position of a target object and measurement of movement of the target object relative to the vehicle cannot be made sufficiently well to justify automatic application of the vehicle braking system by the apparatus 120.

The value of auto_alignment_angle_fast could exceed the maximum alignment angle value following a collision of the vehicle with an object as described above.

Figure 2:
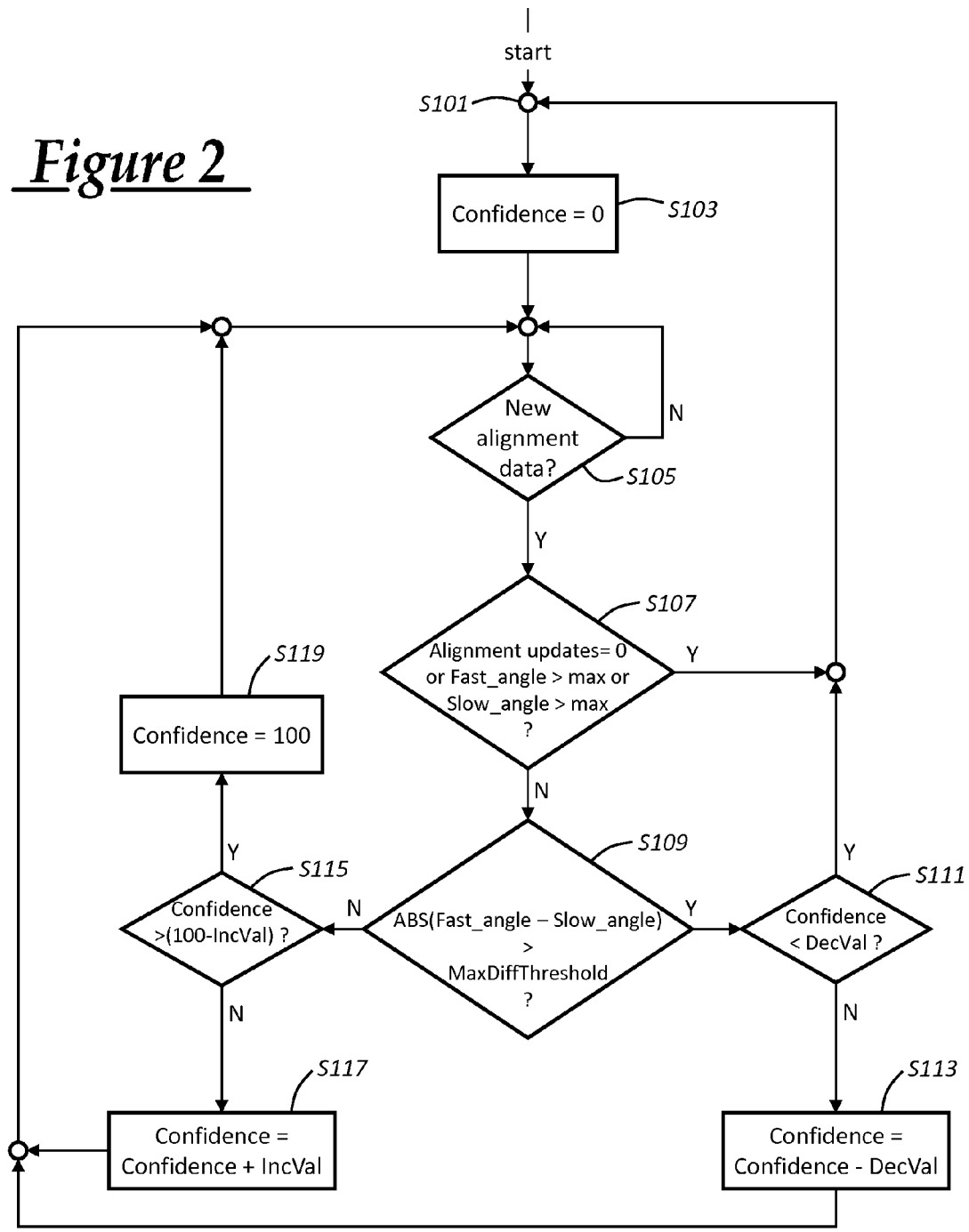
FIG. 2 is a flow chart showing a method according to an embodiment of the invention.

FIG. 2 is a flow chart showing the process described above by which a value of the parameter confidence is determined and updated.

At step S101 the process is begun and at step S103 the value of parameter confidence is set to zero. The module continues to step S105.

At step S105 the module 121 determines whether new alignment data is available. As noted above new alignment data is made available when a new stationary target object is identified and alignment of the TRU 124 has been determined based on movement of the vehicle relative to the new stationary object.

If at step S105 no new alignment data is available the apparatus repeats step S105 until new alignment data is available.

If at step S105 it is determined that new alignment data is available, the module 121 proceeds to step S107. At step S107 it is determined whether any one of three conditions is met. If any one of the conditions is met, the module 121 continues executing at step S103 at which the value of the parameter confidence is set to zero.

The three conditions are that a) a value of a parameter alignment_updates=0; b) a value of the parameter auto_alignment_angle_fast (which may alternatively be referred to as Fast_angle) exceeds a prescribed maximum value 'max'; or c) a value of the parameter auto_alignment_angle (which may alternatively be referred to as Slow_angle) exceeds the prescribed maximum value max. In the present embodiment the prescribed maximum value is 2°.

The parameter alignment_updates may be set to zero if it the vehicle 110 determines that the new alignment data is invalid. The details of such a determination will not be discussed further herein.

Provided none of the conditions a) to c) are met, the module 121 continues executing at step S109.

At step S109 it is determined whether the absolute value of the difference between the parameters auto_alignment_angle_fast and auto_alignment_angle exceeds a parameter MaxDiffThreshold being 0.1° in the present embodiment.

If the difference does exceed 0.1° (or whatever value MaxDiffThreshold has been set to) the module 121 continues executing at step S111.

At step S111 it is determined whether the value of confidence is less than a value of parameter DecVal being the amount by which confidence is to be decremented. If this is the case then the module 121 continues executing at step S101 and at step S103 the value of confidence is set to zero.

If the value of confidence is greater than the amount by which confidence is to be decremented then at step S113 the value of confidence is decremented by the value DecVal. In the present embodiment DecVal is set to 20 as discussed above. The module 121 then continues to step S105.

If the difference between auto_alignment_angle_fast and auto_alignment_angle does not exceed the parameter MaxDiffThreshold, the module 121 continues at step S115.

At step S115 it is determined whether the current value of confidence is set to a value greater than the difference between the maximum allowable value of confidence (which is 100 in the present embodiment although other values are also useful) and the amount by which confidence is to be incremented (IncVal). That is, whether if the value of confidence is incremented by IncVal it will exceed 100.

If this is the case then at step S119 confidence is set to 100 and the module 121 continues to step S105.

If this is not the case then at step S117 confidence is incremented by IncVal and the module 121 continues at step S105.

In the present embodiment IncVal is set to a value of 0.25.

It is to be understood that embodiments of the present invention have the advantage that a risk that the IEB system is triggered when collision of the vehicle is not imminent following an abrupt change in alignment of the TRU 124 may be reduced.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus for monitoring one or more target objects in an environment external to a vehicle by means of at least one sensor, the apparatus being arranged to trigger at least one action responsive to the detection of prescribed relative movement between the vehicle and the one or more target objects, wherein the apparatus is arranged to store a value of a reference angle parameter indicative of a reference angle of misalignment of the at least one sensor; to determine whether the at least one sensor is correctly aligned with respect to the vehicle by comparing a measured value of misalignment angle with the reference angle; not to trigger the at least one action unit the apparatus has determined that the at least one sensor is correctly aligned when the apparatus commences monitoring of the environment and, thereafter, to allow triggering of the at least one action when the apparatus has determined that the at least one sensor is correctly aligned; and not to permit triggering of the at least one action when it is determined that a difference between a single measured angle of misalignment and the reference angle is greater than a prescribed tolerance angle.

2. The apparatus as claimed in claim 1 arranged to trigger the at least one action responsive to the detection of prescribed relative movement between the host vehicle and the one or more target objects in dependence on the speed of the host vehicle.

3. The apparatus as claimed in claim 1 operable to determine whether the at least one sensor is correctly aligned responsive to measurement of relative movement between the vehicle and at least one stationary target object.

4. The apparatus as claimed in claim 1 operable repeatedly to determine whether the at least one sensor is correctly aligned responsive to measurement of the relative movement between the vehicle and at least one target object.

5. The apparatus as claimed in claim 1 arranged to allow triggering of the at least one action when the apparatus has determined that the at least one sensor is correctly aligned by performing a measurement of alignment at a prescribed number of successive moments in time, or to allow triggering of the at least one action when the apparatus has determined that the at least one sensor is correctly aligned after each of a prescribed number of successive measurements of alignment.

6. The apparatus as claimed in claim 5 wherein each successive measurement of alignment is made with respect to a target object that is different from the target object with respect to which the preceding measurement of alignment was made.

7. The apparatus as claimed in claim 1 configured to set a confidence parameter being a parameter indicative of a level of confidence that the at least one sensor is correctly aligned to a first value when the apparatus commences monitoring of the environment, the first value indicating that confidence is low, and subsequently to increment the value of the first parameter by a prescribed increment value each time it is determined that a difference between the measured angle of misalignment and the reference angle of misalignment is less than or equal to a prescribed tolerance angle.

8. The apparatus as claimed in claim 7 configured to decrement the confidence parameter by a prescribed decrement value each time it is determined that a difference between the measured angle of misalignment and the reference angle is greater than the prescribed tolerance angle, optionally wherein the decrement value is greater than the increment value.

9. The apparatus as claimed in claim 7 configured to set the confidence parameter to the first value if the reference angle exceeds a prescribed maximum reference angle value.

10. The apparatus as claimed in claim 7 arranged to allow triggering of the at least one action only if the value of the confidence parameter exceeds a prescribed second value.

11. The apparatus as claimed in claim 1 wherein the reference angle parameter is an average value of the measured value of misalignment angle over a prescribed number of measurements of misalignment angle.

12. The apparatus as claimed in claim 1 comprising or in combination with range determination means operable to determine the range of the target object from the host vehicle and the rate of change of the range.

13. The apparatus as claimed in claim 12 wherein the range determination means comprises either a radar transmitter and a radar receiver or an ultrasonic transmitter and an ultrasonic receiver, the apparatus being arranged to determine the range of the target object from the vehicle by means of a signal transmitted from the transmitter and received at the receiver following reflection by the target object.

14. A vehicle comprising an apparatus as claimed in claim 1.

15. A vehicle comprising an apparatus for monitoring one or more target objects in an environment external to the vehicle by means of at least one sensor, the apparatus being arranged to trigger at least one action responsive to the detection of prescribed relative movement between the vehicle and the one or more target objects, wherein the apparatus is arranged to store a value of a reference angle parameter indicative of a reference angle of misalignment of the at least one sensor; to determine whether the at least one sensor is correctly aligned with respect to the vehicle by comparing a measured value of misalignment angle with the reference angle; not to trigger the at least one action until the apparatus has determined that the at least one sensor is correctly aligned when the apparatus commences monitoring of the environment and, thereafter, to allow triggering of the at least one action when the apparatus has determined that the at least one sensor is correctly aligned; not to permit triggering of the at least one action when it is determined that a difference between a single measured angle of misalignment and the reference angle is greater than a prescribed tolerance angle, the apparatus comprising range determination means operable to determine the range of the target object from the host vehicle and the rate of change of the range, the range determination means comprising either a radar transmitter and a radar receiver or an ultrasonic transmitter and an ultrasonic receiver, the apparatus being arranged to determine the range of the target object from the vehicle by means of a signal transmitted from the transmitted and received at the receiver following reflection by the target object.

16. A method of monitoring one or more target objects in an environment external to a vehicle by means of at least one sensor, the method comprising detecting a position of the one or more target objects with respect to the vehicle and triggering at least one action responsive to the detection of prescribed relative movement between the vehicle and the one or more target objects; storing a value of a reference angle parameter indicative of a reference angle of misalignment of the at least one sensor; commencing monitoring of the environment using the at least one sensor; and determining whether the at least one sensor is correctly aligned with respect to the vehicle by comparing a measured value of misalignment angle with the reference angle and not triggering the at least one action until it has been determined that the at least one sensor is correctly aligned and therefore allowing triggering of the at least one action when it has been determined that the at least one sensor is correctly aligned; and not permitting triggering of the at least one action when it is determined that a difference between a single measured angle of misalignment and the reference angle is greater than a prescribed tolerance angle.

* * * * *